(12) United States Patent
Zhou et al.

(10) Patent No.: US 12,089,270 B2
(45) Date of Patent: Sep. 10, 2024

(54) METHOD AND APPARATUS FOR ESTABLISHING DATA TRANSMISSION LINK AND COMPUTER-READABLE STORAGE MEDIUM

(71) Applicant: ZTE CORPORATION, Guangdong (CN)

(72) Inventors: Xingyue Zhou, Guangdong (CN); Xueyan Song, Guangdong (CN); Shuang Liang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 335 days.

(21) Appl. No.: 17/624,419

(22) PCT Filed: Jun. 29, 2020

(86) PCT No.: PCT/CN2020/098786
§ 371 (c)(1),
(2) Date: Jan. 3, 2022

(87) PCT Pub. No.: WO2021/000827
PCT Pub. Date: Jan. 7, 2021

(65) Prior Publication Data
US 2022/0377819 A1    Nov. 24, 2022

(30) Foreign Application Priority Data

Jul. 3, 2019   (CN) .......................... 201910595342.5

(51) Int. Cl.
*H04W 76/00*      (2018.01)
*H04L 12/46*      (2006.01)
(Continued)

(52) U.S. Cl.
CPC ......... *H04W 76/12* (2018.02); *H04L 12/4633* (2013.01); *H04W 76/11* (2018.02); *H04W 80/10* (2013.01)

(58) Field of Classification Search
None
See application file for complete search history.

(56) References Cited

U.S. PATENT DOCUMENTS 11,252,775 B2 * 2/2022 Yu .......................... H04W 76/25
2018/0254919 A1 * 9/2018 Van De Velde ...... H04L 12/462
(Continued)

FOREIGN PATENT DOCUMENTS

CN      108965159 A      12/2018
CN      110536481 A      12/2019
(Continued)

OTHER PUBLICATIONS

WIPO, International Search Report issued on Sep. 10, 2020.
(Continued)

*Primary Examiner* — Gerald A Smarth
(74) *Attorney, Agent, or Firm* — Li & Cai Intellectual Property (USA) Office (57) ABSTRACT

Provided are a method and apparatus for establishing a data transmission link, and a computer-readable storage medium. By means of establishing a protocol data unit (PDU) session, a PDU session ID and a quality of service flow ID in the PDU session are encapsulated in an ID of a generic routing encapsulation (GRE) tunnel by means of GRE, and a connection between a 5G residential gateway (5G-RG) and a wireline access gateway function (W-AGF) is established through a GRE tunnel such that the GRE tunnel connection established between the 5G-RG and the W-AGF is in one-to-one correspondence with the quality of service flow of the PDU session, and user plane point-to-point connec- (Continued)

tion between the 5G-RG and the W-AGF is realized in certain implementation processes.

8 Claims, 6 Drawing Sheets

(51) Int. Cl.
    *H04W 76/11*     (2018.01)
    *H04W 76/12*     (2018.01)
    *H04W 80/10*     (2009.01)

(56) References Cited

U.S. PATENT DOCUMENTS

| | | |
|---|---|---|
| 2020/0092212 A1 | 3/2020 | Yu |
| 2020/0107388 A1 | 4/2020 | Yu et al. |
| 2022/0303823 A1* | 9/2022 | Guo ................. H04W 76/20 |

FOREIGN PATENT DOCUMENTS

| | | | |
|---|---|---|---|
| EP | 4075907 A1 * | 10/2022 | ........ H04W 72/1268 |
| WO | WO-2017135986 A1 * | 8/2017 | |
| WO | WO-2018174887 A1 * | 9/2018 | |
| WO | WO 2018233484 A1 | 12/2018 | |

OTHER PUBLICATIONS

Convida Wireless LLC, Ericsson. "Correction to the UE Requested PDU Session Establishment via Untrusted non-3GPP Access Procedure," 3GPP TSG-SA WG2 Meeting #126, Montreal, Canada, Mar. 2, 2018.

Nokia, Nokia Shanghai Bell. "Update to Session Management procedures for RG," SA WG2 Meeting #134, Sapporro, Japan, Jun. 28, 2019.

Ericsson. "W-CP and W-UP requirements," SA WG2 Meeting #133, Reno, Nevada, US, May 17, 2019.

Indian Patent Office, First office action dated Jul. 6, 2022, for corresponding IN application No. 202217003670.

TCL, "Mobility enhancement mechanism for 0ms interruption handover in NR", 3GPP TSG-RAN2#101, Mar. 2, 2018.

Nokia, "Update to Session Management procedures for RG", SA WG2 Meeting #134 , Jun. 28, 2019.

European Patent Office, the extended European Search Report dated Jul. 3, 2023, for corresponding EP application No. 20835443.1.

Broadband Forum: "Revision 3 contrib-20838 SD-420 R3 5G Fixed Mobile Convergence Study", 3GPP Draft, dated Jan. 18, 2019.

"3rd Generation Partnership Project; Technical specification Group Services and System Aspects; Study on the Wireless and WireLine Convergence for the 5G system architecture," 3GPP Standard; Technical Report, No. V2.0.0, retrieved on Dec. 4, 2018, XP051591016.

"3rd Generation Partnership Project; Technical specification Group Services and System Aspects; Study on the Wireless and WireLine Convergence for the 5G system architecture (Release 15)", 3GPP Standard; Technical Report, No. V0.3.0, retrieved on Mar. 12, 2018, XP051450342.

"3rd Generation Partnership Project: Technical specification Group Services and System Aspects; Study on the Wireless and WireLine Convergence for the 5G system architecture (Release 16)" , 3GPP Draft, Apr. 27, 2018, XP051449730.

Nokia Shanghai Bell:"Update to Session Management procedures for RG", 3GPP Draft S2-1907855 Jun. 27, 2019, XP051756509.

Convida Wireless LLC; Ericsson :"Correction to UE Requested PDU Session Establishment via Untrusted non-3GPP Access Procedure", 3GPP Draft; S2-182518 rev of 1937-23.502-Correction, Mar. 1, 2018.

* cited by examiner

METHOD AND APPARATUS FOR ESTABLISHING DATA TRANSMISSION LINK AND COMPUTER-READABLE STORAGE MEDIUM

TECHNICAL FIELD

Embodiments of the present disclosure relate to, but are not limited to, the technical field of communication applications.

BACKGROUND

Figure 1:
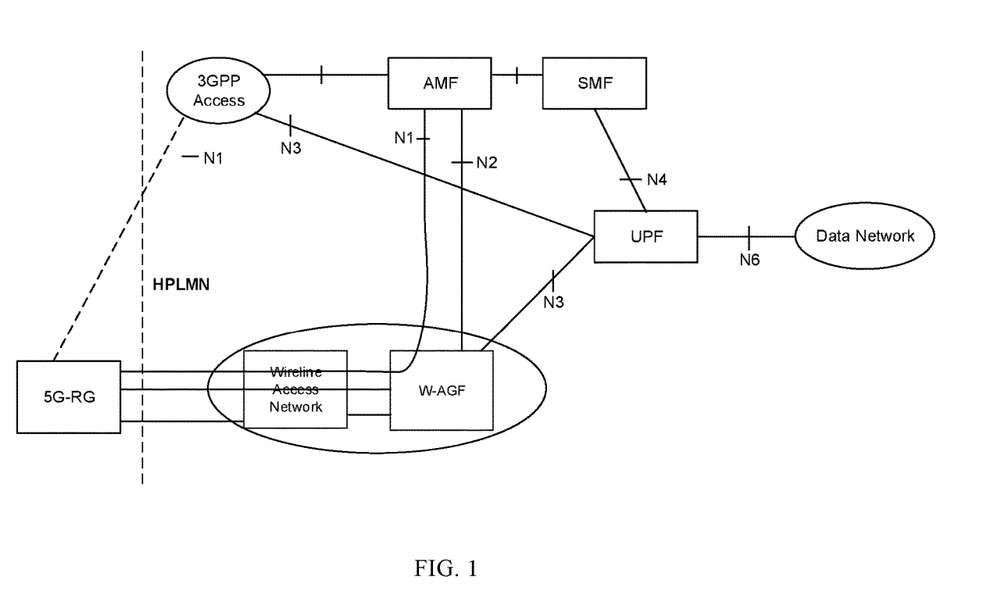
FIG. 1 is a schematic diagram of a 5G system architecture according to an embodiment of the present disclosure.

The 3rd Generation Partnership Project (3GPP) and the Broadband Forum (BBF) are studying on how to connect a residential gateway (RG) to a 5G system over a wireline access network. As shown in FIG. 1, the RG is accessed to a wireline access network and connected to a 5G system through a wireline access gateway function (W-AGF). The 5G-RG may also be connected to the 5G system through a 3GPP access.

The 5G-RG is registered to the 5G system using EAP-5G defined by 3GPP TS 23.502. The 5G-RG supports an N1 interface to an access and mobility management function (AMF), the W-AGF supports an N2 interface to AMF and an N3 interface to a user plane function (UPF).

There is a connection between the 5G-RG and the W-AGF for transmitting control plane packets and user plane packets from the 5G-RG to the 5G network, where the control plane packets are non-access stratum (NAS) messages. For the user plane packets, the W-AGF needs to identify a protocol data unit (PDU) session and a quality of service (QoS) flow corresponding to a received uplink packet, and correspondingly forward the PDU session and the QoS flow through an N3 interface to the UPF. Meanwhile, for a downlink packet, the W-AGF also needs to provide an identifier (ID) for a user equipment (UE) so that the UE can distinguish the PDU session and the QoS flow.

In the current standard discussions of 3GPP and BBF, it is not decided which protocol is adopted to implement the wireline access control plane protocol (W-CP) for management of the connection between 5G-RG and the W-AGF, nor is it determined how the connection associated with PDU sessions and QoS flows is implemented between the 5G-RG and the W-AGF.

SUMMARY

An embodiment of the present disclosure provides a method for establishing a data transmission link, including: sending, from a 5G residential gateway (5G-RG), a protocol data unit (PDU) session establishment request message to an access and mobility management function (AMF); receiving, by the 5G-RG, a first wireline access control plane protocol (W-CP) request message sent from a wireline access gateway function (W-AGF), where the first W-CP request message contains a PDU session ID and a quality of service (QoS) flow ID (QFI); and the PDU session ID and the QFI are sent from the AMF to the W-AGF; sending, from the 5G-RG, a first W-CP response message to the W-AGF; receiving, by the 5G-RG, a PDU session establishment accept message sent from the W-AGF; and establishing a connection between the 5G-RG and the W-AGF through a generic routing encapsulation (GRE) tunnel, where the GRE tunnel ID contains the PDU session ID and the QFI; and the GRE tunnel ID is contained in a GRE key of a GRE header.

An embodiment of the present disclosure provides a method for establishing a data transmission link, including: forwarding, by a wireline access gateway function (W-AGF), a protocol data unit (PDU) session establishment request message sent from a 5G residential gateway (5G-RG) to an access and mobility management function (AMF); where the PDU session establishment request message is sent from the AMF to a session management function (SMF); receiving, by the W-AGF, a first N2 session request sent from the AMF, where the first N2 session request contains a PDU session establishment accept message generated by the SMF according to the PDU session establishment request message sent from the 5G-RG; generating, by the W-AGF, a first wireline access control plane protocol (W-CP) request message, and sending the first W-CP request message to the 5G-RG, where the first W-CP request message contains a PDU session ID and a quality of service (QoS) flow ID; and the PDU session ID and the QFI are sent from the AMF to the W-AGF; receiving, by the W-AGF, a first W-CP response message sent from the 5G-RG; sending, from the W-AGF, a PDU session establishment accept message to the 5G-RG; sending, from the W-AGF, a PDU session request acknowledgement message to the AMF to acknowledge establishment of the PDU session; and establishing connection between the W-AGF and the 5G-RG through a generic routing encapsulation (GRE) tunnel, where the GRE tunnel ID contains the PDU session ID and the QFI; and the GRE tunnel ID is contained in a GRE key of a GRE header.

An embodiment of the present disclosure provides a method for establishing a data transmission link, including: sending, from a 5G residential gateway (5G-RG), a protocol data unit (PDU) session establishment request message to an access and mobility management function (AMF); where the AMF sends the PDU session establishment request message to a session management function (SMF); receiving, by a wireline access gateway function (W-AGF), a first N2 session request sent from the AMF, where the first N2 session request contains a PDU session establishment accept message generated by the SMF according to the PDU session establishment request sent from the 5G-RG; generating, by the W-AGF, a first wireline access control plane protocol (W-CP) request message, and sending the first W-CP request message to the 5G-RG, where the first W-CP request message contains a PDU session ID and a quality of service (QoS) flow ID; and the PDU session ID and the QFI are sent from the AMF to the W-AGF; receiving, by the 5G-RG, a first W-CP request message sent from the W-AGF, and sending a first W-CP response message to the W-AGF; sending, from the W-AGF, a PDU session establishment accept message to the 5G-RG; sending, from the W-AGF, a PDU session request acknowledgement message to the AMF to acknowledge establishment of the PDU session; and establishing connection between the 5G-RG and the W-AGF through a generic routing encapsulation (GRE) tunnel, where the GRE tunnel ID contains the PDU session ID and the QFI; and the GRE tunnel ID is contained in a GRE key of a GRE header.

An embodiment of the present disclosure further provides an apparatus for establishing a data transmission link, including a 5G residential gateway (5G-RG), an access and mobility management function entity (AMF) and a wireline access gateway function entity (W-AGF). The 5G-RG is configured to send the PDU session establishment request message to the AMF, receive a first W-CP request message sent from the W-AGF, and send a first W-CP response message to the W-AGF, and receive a PDU session establishment accept message sent from the W-AGF. The first W-CP request message contains a PDU session ID and a quality of service (QoS) flow ID. The AMF is configured to send the PDU session establishment request message to a session management function (SMF). The W-AGF is configured to forward the PDU session establishment request message sent from the 5G-RG to the AMF, receive the first W-CP response message sent from the 5G-RG, and send a PDU session establishment accept message to the 5G-RG. Connection between the 5G-RG and the W-AGF is established through a generic routing encapsulation (GRE) tunnel, the GRE tunnel ID contains the PDU session ID and the QFI; and the GRE tunnel ID is contained in a GRE key of a GRE header.

An embodiment of the present disclosure further provides an apparatus for establishing a data transmission link, including a wireline access gateway function entity (W-AGF), an access and mobility management function entity (AMF) and a 5G residential gateway (5G-RG). The W-AGF is configured to forward the PDU session establishment request message sent from the 5G-RG to the AMF, receive a first N2 session request sent from the AMF, generate a first W-CP request message and send the first W-CP request message to the 5G-RG, receive the first W-CP response message sent from the 5G-RG, and send a PDU session establishment accept message to the 5G-RG, and send a PDU session request acknowledgement message to the AMF. The first W-CP request message contains a PDU session ID and a quality of service (QoS) flow ID. The AMF is configured to send a first N2 session request to the W-AGF, and receive a PDU session request acknowledgement message sent from the W-AGF. The 5G-RG is configured to send the PDU session establishment request message to the AMF, receive a first W-CP request message sent from the W-AGF, and send a first W-CP response message to the W-AGF, and receive a PDU session establishment accept message sent from the W-AGF. Connection between the 5G-RG and the W-AGF is established through a generic routing encapsulation (GRE) tunnel, the GRE tunnel ID contains the PDU session ID and the QFI; and the GRE tunnel ID is contained in a GRE key of a GRE header.

An embodiment of the present disclosure further provides a communication system for establishing a data transmission link, including a 5G residential gateway (5G-RG), an access and mobility management function entity (AMF) and a wireline access gateway function entity (W-AGF). The 5G-RG is configured to send the PDU session establishment request message to the AMF, receive a first W-CP request message sent from the W-AGF, and send a first W-CP response message to the W-AGF, and receive a PDU session establishment accept message sent from the W-AGF. The first W-CP request message contains a PDU session ID and a quality of service (QoS) flow ID. The AMF is configured to send the PDU session establishment request message to a session management function (SMF), send a first N2 session request to the W-AGF, and receive a PDU session request acknowledgement message sent from the W-AGF. The W-AGF is configured to forward the PDU session establishment request message sent from the 5G-RG to the AMF, receive a first N2 session request sent from the AMF, generate a first W-CP request message and send the first W-CP request message to the 5G-RG, receive the first W-CP response message sent from the 5G-RG, and send a PDU session establishment accept message to the 5G-RG, and send a PDU session request acknowledgement message to the AMF. Connection between the 5G-RG and the W-AGF is established through a generic routing encapsulation (GRE) tunnel, the GRE tunnel ID contains the PDU session ID and the QFI; and the GRE tunnel ID is contained in a GRE key of a GRE header.

An embodiment of the present disclosure further provides a computer-readable storage medium, the computer-readable storage medium having one or more programs stored thereon. The one or more programs are executable by one or more processors to implement operations of the method for establishing a data transmission link as described above.

DETAIL DESCRIPTION OF EMBODIMENTS

For clarity and better understanding of the objects, technical solutions and advantages of the present disclosure, embodiments of the present disclosure will be described in further detail with reference to the following detailed description and accompanying drawings. It should be understood that the specific embodiments described herein are merely for illustration of the present disclosure and are not intended to limit the present disclosure. The embodiments and features of the embodiments of the present disclosure may be combined arbitrarily without conflict.

First Embodiment

In order to solve the problems in the existing art that it is not decided which protocol is adopted to implement the W-CP for management of the connection between 5G-RG and the W-AGF, and that it is not determined how the connection associated with PDU sessions and QoS flows is implemented between the 5G-RG and the W-AGF, embodiments of the present disclosure provide a method for establishing a data transmission link.

Referring to the 5G system shown in FIG. 1 as an example, the 5G system includes a 5G residential gateway (5G-RG), a wireline access network (WAN), a wireline access gateway function (W-AGF), a user plane function (UPF), a data network (DN), an access and mobility management function (AMF), and a session management function (SMF) which use N1 to N6 interfaces for communication, respectively.

Figure 2:
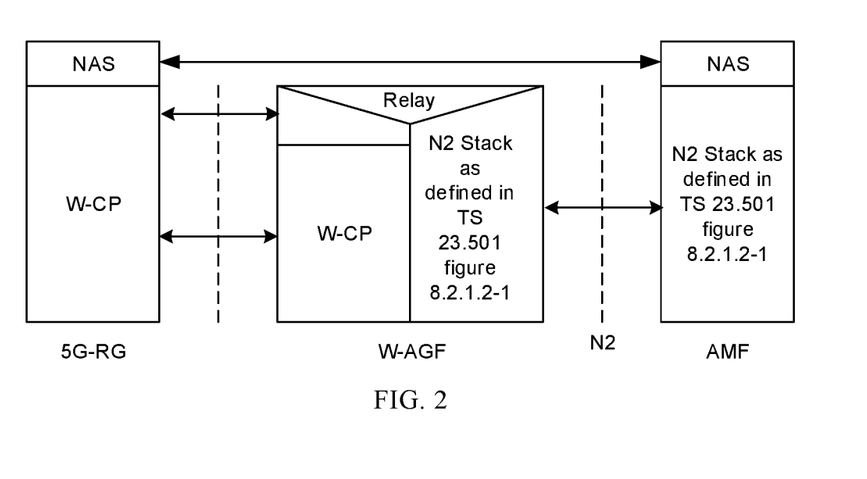
FIG. 2 is a schematic diagram of a protocol stack related to a W-CP and an NAS according to a first embodiment of the present disclosure.

FIG. 2 is a schematic diagram of a protocol stack related to a W-CP and an NAS. The NAS messages between the UE and the AMF are forwarded through the W-AGF, and the NAS messages between the UE and the W-AGF are carried by W-CP messages.

Figure 4:
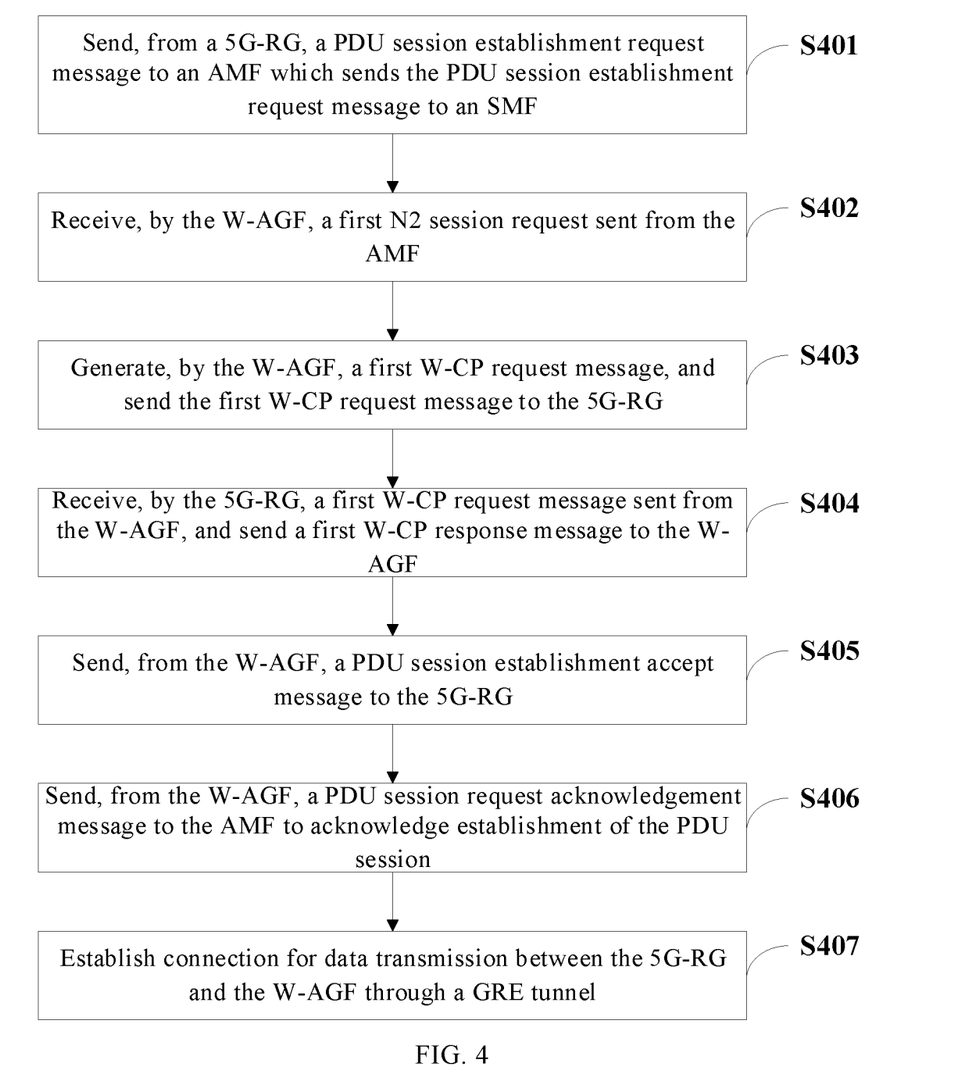
FIG. 4 is a basic flowchart of a method for establishing a data transmission link according to the first embodiment of the present disclosure.

FIG. 4 is a basic flowchart of a method for establishing a data transmission link provided in an embodiment of the present disclosure. As shown in FIG. 4, the method may include the following operations S401 to S407.

At operation S401, sending, from a 5G residential gateway (5G-RG), a protocol data unit (PDU) session establishment request message to an access and mobility management function (AMF) which sends the PDU session establishment request message to a session management function (SMF).

It should be noted that the PDU session establishment request message itself is an NAS PDU message type, and in this embodiment, the process of sending the PDU session establishment request message from the 5G-RG to the AMF includes: sending, from the 5G-RG, the PDU session establishment request message to the W-AGF which extracts the NAS message and forwards the message to the AMF.

In this embodiment, the communication connection between the 5G-RG and the AMF is implemented by a wireline access control plane protocol (W-CP), and it should be noted that the W-CP may be any protocol message.

This embodiment may also be implemented by a wireless LAN control plane protocol (WLCP). In this case, the 5G-RG sends a WLCP message containing an NAS PDU session establishment request message to the W-AGF which extracts the NAS message and sends the message to the AMF.

At operation S402, receiving, by the W-AGF, a first N2 session request sent from the AMF.

In this embodiment, before receiving, by the W-AGF, the first N2 session request sent from the AMF, the AMF selects SMF and UPF according to the received NAS message, and acquires policy control information of the PDU session to be established from a policy control function (PCF), to establish or update user plane resources on a network side, such as an N4 interface between the SMF and the UPF.

It should be noted that the first N2 session request contains a PDU session establishment accept message generated by the SMF according to the PDU session establishment request sent from the 5G-RG.

In this embodiment, since the AMF and the W-AGF are connected through an N2 interface, the SMF generates a PDU session request and forwards the PDU session request to the AMF which sends the PDU session request to the W-AGF through the N2 interface. That is, the AMF sends an N2 message to the W-AGF, and the W-AGF receives the N2 message sent from the AMF.

It should be noted that the N2 message contains a PDU session establishment accept NAS message, PDU session ID, QoS profiles and associated QoS flow identifier(s) (QFI(s)) sent to the 5G-RG.

At operation S403, generating, by the W-AGF, a first wireline access control plane protocol (W-CP) request message, and sending the first W-CP request message to the 5G-RG.

In this embodiment, the first W-CP request message contains a PDU session ID and an established QFI; and it should be noted that depending on the actual situation, there may be one or more QFIs.

At operation S404, receiving, by the 5G-RG, a first W-CP request message sent from the W-AGF, and sending, by the 5G-RG, a first W-CP response message to the W-AGF.

At operation S405, sending, from the W-AGF, a PDU session establishment accept message to the 5G-RG.

At operation S406, sending, from the W-AGF, a PDU session request acknowledgement message to the AMF to acknowledge establishment of the PDU session.

At operation S407, establishing a connection for data transmission between the 5G-RG and the W-AGF through a generic routing encapsulation (GRE) tunnel.

In this embodiment, the GRE tunnel ID (or ID of the GRE tunnel) contains the PDU session ID and the QFI, and the GRE tunnel ID is contained in a GRE key of a GRE header.

It should be noted that the GRE tunnel ID contains the PDU session ID and one QFI. In this way, the GRE tunnel connection established between the 5G-RG and the W-AGF is in one-to-one correspondence with the QoS flow of the PDU session.

Figure 5:
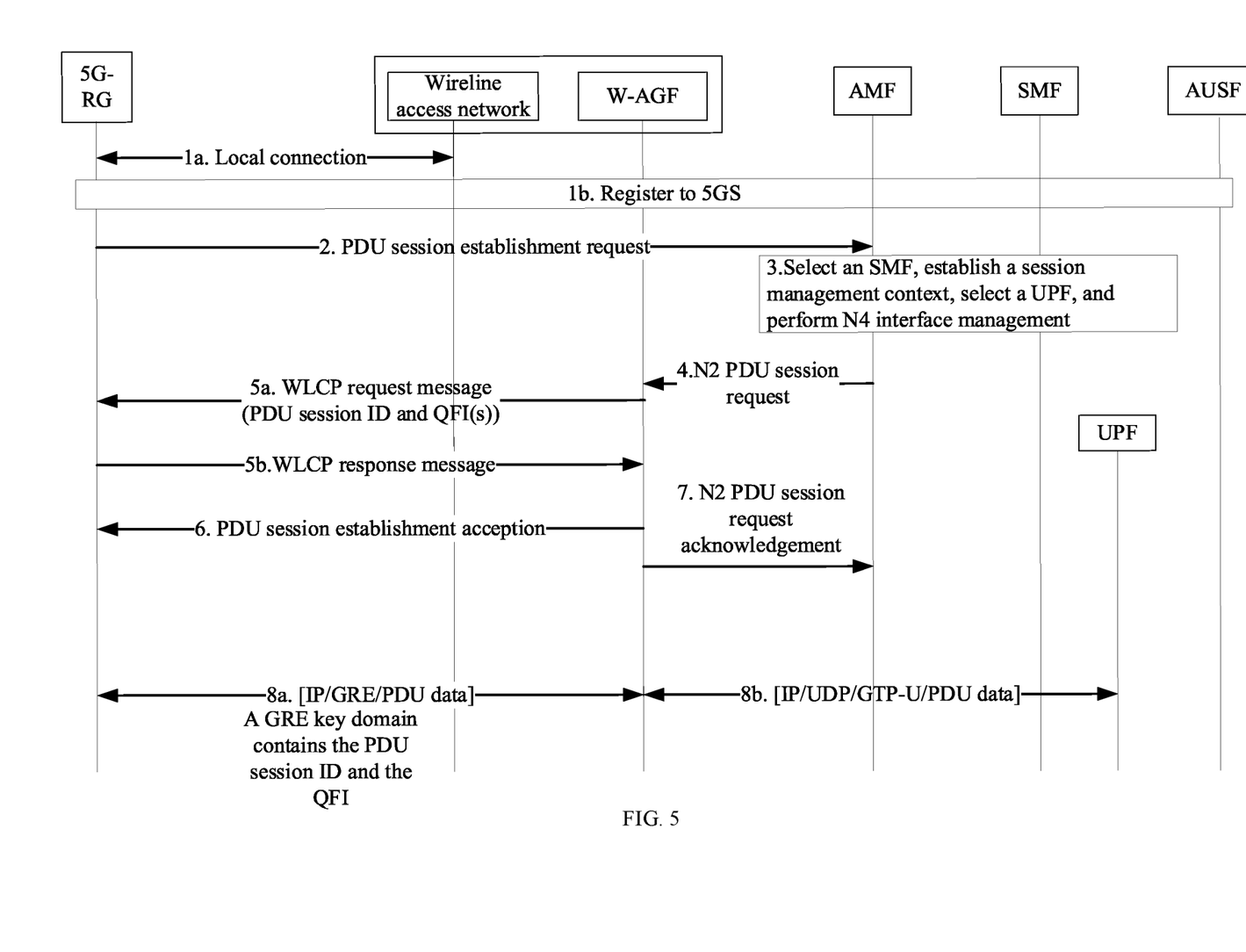
FIG. 5 is a schematic flowchart of establishing a PDU session according to the first embodiment of the present disclosure.

Referring to FIG. 5, the procedure of establishing a PDU session in this embodiment may include the following operations 1a to 8b.

At operation 1a, establishing, by a 5G-RG, a local connection to a wireline access network, and configuring a connection parameter.

At operation 1b, initiating, by the 5G-RG, a registration procedure to a 5G system to register to the 5G system (5GS).

It should be noted that the configured connection parameter includes, but is not limited to, a local IP address and a W-AGF address.

At operation 2, initiating, by the 5G-RG, a PDU session establishment request to the AMF which sends the PDU session establishment request message to a session management function (SMF).

In this embodiment, the communication connection between the 5G-RG and the AMF may be implemented by a wireless LAN control plane protocol (WLCP). In this case, the 5G-RG sends a WLCP message containing an NAS PDU session establishment request message to the W-AGF which extracts the NAS message and sends the message to the AMF.

At operation 3, selecting, by the AMF, SMF and UPF according to the received NAS message, and acquiring policy control information of the PDU session to be established from a policy control function (PCF), to establish or update user plane resources on a network side, such as an N4 interface between the SMF and the UPF.

The principle of selecting, by the AMF, the SMF according to the received NAS message is that: the 5G-RG allocates different PDU session IDs for different PDU sessions; the non-access stratum message sent from the 5G-RG to the AMF includes: single network slice selection assistance information (S-NSSAI), PDU Session ID, and N1 SM information, which is a message transferred from the N1 interface to the SMF, i.e., a session management message transferred to the SMF, the specific form of which includes: NAS message (S-NSSAI, DNN, a PDU session ID, N1 SM information).

The currently defined PDU session establishment request message contains the above information. The AMF parses the S-NSSAI, the DNN and the PDU session ID, but not the N1 SM information. The S-NSSAI, the DNN and the PDU session ID are used by the AMF to perform SMF selection. When receiving the NAS message, the AMF selects SMF information of a route according to the PDU session ID. If the PDU session has been established before, the AMF will reserve the association between the PDU session ID and the SMF ID. Subsequently, when receiving the session management non-access stratum message (SM NAS message) related to the PDU session ID, the AMF will directly transfer the SM NAS message to the SMF for processing. If the initiated NAS message is a request for establishing a new PDU session, then there is no SMF ID associated with the PDU session ID in the NAS message. The SMF needs to select a new SMF ID for the new PDU session according to information such as the S-NSSAI, the DNN, or the like, and stores the association between the PDU session ID and the SMF ID.

In this embodiment, after the AMF selects a SMF for the 5G-RG, the SMF establishes a PDU session for data transmission for the 5G-RG, acquires policy control information of the PDU session to be established from the PCF, and assigns to the PDU session a QFI for QoS control of the PDU session. The SMF establishes or updates a message through the N4 interface and sends the QFI to the UPF.

At operation 4, sending, from the AMF, a first N2 session request to the W-AGF.

In this embodiment, the AMF sends a PDU session request to the W-AGF through the N2 interface, so the PDU session request may also be referred to as "N2 message". The N2 message contains a PDU session establishment accept NAS message, PDU session ID, QoS profiles and associated QoS flow identifier(s) (QFI(s)) sent to the 5G-RG.

At operation 5a, transferring, by the W-AGF, the W-CP message carrying the PDU session ID and the established QFI to the 5G-RG.

At operation 5b, sending, by the 5G-RG, a first W-CP response message to the W-AGF.

It should be noted that the W-CP message may be message of any protocol, and in this embodiment, the W-CP message may be a WLCP message defined by 3GPP TS 24.244.

Figure 3:
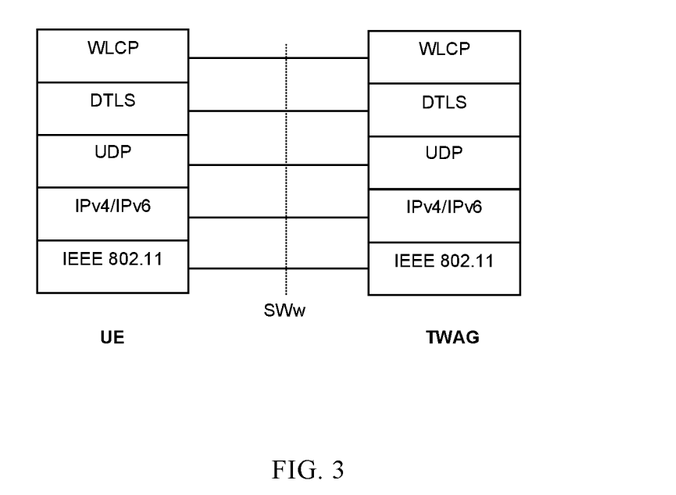
FIG. 3 is a schematic diagram of a protocol stack used between a user equipment and an access network according to the first embodiment of the present disclosure.

It should be understood that the WLCP protocol is a protocol used between a UE and a trusted WLAN access gateway (TWAG) in a scenario where a trusted WLAN access network is connected to an evolved packet system (EPS) for managing packet data network (PDN) sessions from the UE to the network, a protocol stack of which is specifically shown in FIG. 3. The WLCP protocol is formulated in 3GPP TS 24.244, the transport layer uses a user datagram protocol (UDP) (with a UDP port number 36411), and a datagram transport layer security protocol (DTLS) is used above to implement WLCP signaling security protection.

The above protocol stack is directed to a 4G system. If WLCP is appropriately extended so that the physical layer and the link layer are not limited to 802.11 link, a message type of WLCP is extended to adapt to the PDU session management, and a new information element carried by a WLCP message, such as an NAS message, a PDU session ID, or the like is added, then WLCP may be used between the 5G-RG and the W-AGF to implement the W-CP protocol.

In this embodiment, depending on the actual situation, there may be one or more QFIs.

At operation 6, sending, from the W-AGF, the PDU session establishment accept message to the 5G-RG.

At operation 7, sending, from the W-AGF, a PDU session request acknowledgement to the AMF through the N2 interface to acknowledge that establishment of the PDU session is completed.

At operation 8a, establishing a connection between the 5G-RG and the W-AGF through a generic routing encapsulation (GRE) tunnel. The GRE tunnel ID contains the PDU session ID and the QFI; and the GRE tunnel ID is contained in a GRE key of a GRE header.

At operation 8b, establishing a GTP user plane tunnel between the W-AGF and the UPF to transmit user PDU data.

Figure 6:
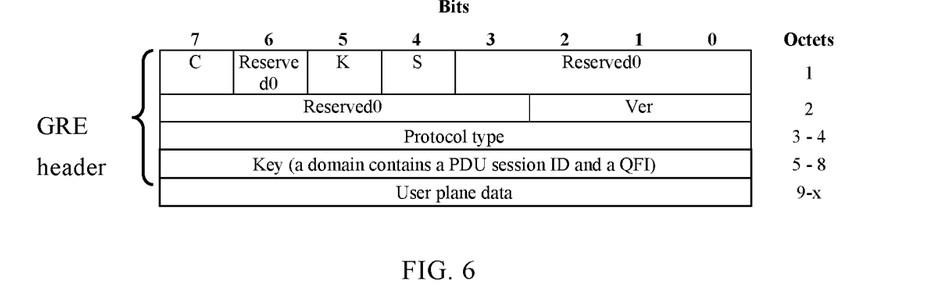
FIG. 6 is a schematic diagram of GRE encapsulation according to the first embodiment of the present disclosure.

In this embodiment, as shown in FIG. 6, the user plane data between the 5G-RG and the W-AGF may be encapsulated and transmitted by GRE. That is, the user plane point-to-point connection between the 5G-RG and the W-AGF is realized through the GRE tunnel.

For example, the PDU session ID and the QFI are encapsulated by GRE, the GRE tunnel is identified by a GRE key, and the PDU session ID and the QFI are encapsulated in a GRE key of a GRE header.

It should be noted that the PDU ID and one QFI are encapsulated in one GRE tunnel. In this way, the GRE key of the GRE layer contains the PDU session ID and the QFI. The GRE key, as the ID of the GRE tunnel, contains the PDU session ID and the QFI, thereby keeping in one-to-one correspondence with the QoS flow.

In the method for establishing a data transmission link provided in an embodiment of the present disclosure, by means of establishing a PDU session, the user plane data between the 5G-RG and the W-AGF may be encapsulated and transmitted by GRE. The GRE tunnel ID contains the PDU session ID and the QFI; and the GRE tunnel ID is contained in a GRE key of a GRE header, thereby realizing user plane point-to-point connection between the 5G-RG and the W-AGF.

Second Embodiment

Figure 7:
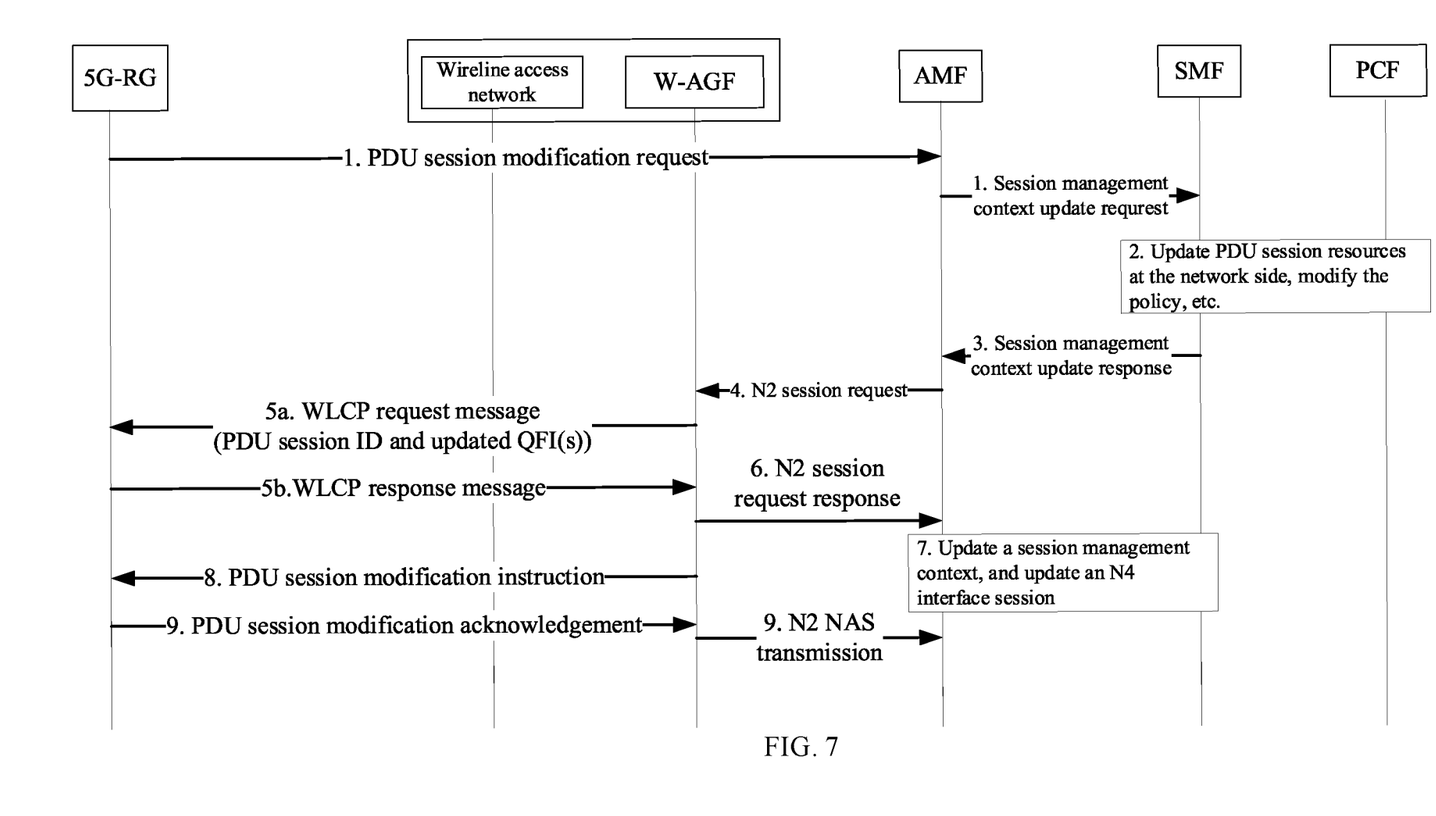
FIG. 7 is a schematic flowchart of modifying a PDU session according to a second embodiment of the present disclosure.

Based on the above embodiment, this embodiment further provides a method for establishing a data transmission link. This embodiment is the same as the foregoing embodiment except that this embodiment involves PDU session modification. Therefore, detailed description is omitted. Referring to FIG. 7, the method may include operations 1 to 9.

At operation 1, sending, from the 5G-RG, a PDU session modification request to the AMF which initiates a PDU session management context update request to an SMF.

At operation 2, performing corresponding PDU session resource update, policy modification, or the like at a network side according to the PDU session management context update request.

At operation 3, sending, from the SMF, a session management context update response message to the AMF.

At operation 4, sending, from the AMF, a second N2 session request to the W-AGF.

It should be noted that the second N2 session request is generated by the AMF according to a PDU session management context update response sent from the SMF, and the second N2 session request contains a PDU session modification instruction message sent to the 5G-RG.

At operation 5a, sending, from the W-AGF, a second W-CP request message to the 5G-RG. The second W-CP request message contains a PDU session ID to be modified and an updated QFI(s).

At operation 5b, sending, by the 5G-RG, a second W-CP response message to the W-AGF.

In this embodiment, the updated QFI includes, but is not limited to, deletion or addition of a QoS flow on the PDU session.

It should be noted that the W-CP message may be message of any protocol, and in this embodiment, the W-CP message may be a WLCP message defined by 3GPP TS 24.244.

At operation 6, sending, from the W-AGF, a PDU session request response to the AMF.

At operation 7, updating the session management context at the network side, and updating the session management at the N4 interface, according to the PDU session request response.

At operation 8, sending, from the W-AGF, a PDU session modification instruction to the 5G-RG.

At operation 9, returning, from the 5G-RG, a PDU session modification acknowledgement message to the W-AGF which sends the message to the AMF.

In this embodiment, the W-AGF sends the message to the AMF. For example, the W-AGF transmits the NAS information to the AMF through the N2 interface.

In the method for establishing a data transmission link provided in an embodiment of the present disclosure, by modifying the PDU session between the 5G-RG and the W-AGF and updating the QFI, the transmission of the user plane data between the 5G-RG and the W-AGF can become more flexible, and by performing modifications according to actual needs, the transmission efficiency is improved.

Third Embodiment

This embodiment further provides an apparatus for establishing a data transmission link, including a 5G residential gateway (5G-RG), an access and mobility management function entity (AMF) and a wireline access gateway function entity (W-AGF).

Exemplarily, the 5G-RG is configured to send the PDU session establishment request message to the AMF, receive a first W-CP request message sent from the W-AGF, and send a first W-CP response message to the W-AGF, and receive a PDU session establishment accept message sent from the W-AGF.

Exemplarily, the AMF is configured to send the PDU session establishment request message to an SMF, send a first N2 session request to the W-AGF, and receive a PDU session request acknowledgement message sent from the W-AGF.

Exemplarily, the W-AGF is configured to send the PDU session establishment request message to the AMF, receive a first W-CP request message sent from the W-AGF, and send a first W-CP response message to the W-AGF, and receive a PDU session establishment accept message sent from the W-AGF.

In this embodiment, the first W-CP request message contains a PDU session ID and a QFI; and a connection between the 5G-RG and the W-AGF is established through a GRE tunnel, the GRE tunnel ID contains the PDU session ID and the QFI; and the GRE tunnel ID is contained in a GRE key of a GRE header.

It should be noted that the GRE tunnel ID contains the PDU session ID and one QFI. In this way, the GRE tunnel connection established between the 5G-RG and the W-AGF is in one-to-one correspondence with the QoS flow of the PDU session.

Fourth Embodiment

Based on the above embodiment and PDU session modifications, this embodiment further provides an apparatus for establishing a data transmission link, including a 5G residential gateway (5G-RG), an access and mobility management function entity (AMF) and a wireline access gateway function entity (W-AGF).

Exemplarily, the 5G-RG is configured to send a PDU session modification request to the AMF, receive a second W-CP request message sent from the W-AGF, send a second W-CP response message to the W-AGF, receive a PDU session modification instruction message sent from the W-AGF, and return a PDU session modification acknowledgement message to the W-AGF.

Exemplarily, the AMF is configured to receive a PDU session modification request sent from the 5G-RG, send a PDU session ID and an updated QFI to the W-AGF, send a PDU session management context update request to the SMF, generate a second N2 session request according to a PDU session management context update response sent from the SMF, and send the second N2 session request to the W-AGF, receive a PDU session request response message sent from the W-AGF, and receive an NAS message sent from the W-AGF that is extracted from the PDU session modification acknowledgement message sent from the 5G-RG.

Exemplarily, the W-AGF is configured to receive a second N2 session request sent from the AMF, generate a second W-CP request message and send the second W-CP request message to the 5G-RG, receive the second W-CP response message sent from the 5G-RG, send a PDU session request response message to the AMF, send a PDU session modification instruction message to the 5G-RG, and receive a PDU session modification acknowledgement message sent from the 5G-RG and send the message to the AMF through the N2 interface.

In the apparatus for establishing a data transmission link based on PDU session modifications provided in an embodiment of the present disclosure, by modifying the PDU session between the 5G-RG and the W-AGF and updating the QFI, the transmission of the user plane data between the 5G-RG and the W-AGF can become more flexible, and by performing modifications according to actual needs, the transmission efficiency is improved.

Fifth Embodiment

This embodiment further provides a computer-readable storage medium, which includes volatile or non-volatile, removable or non-removable media implemented in any method or technology for storage of information, such as computer-readable instructions, data structures, computer program modules, or other data. The computer-readable storage medium includes, but is not limited to, a random access memory (RAM), a read-only memory (ROM), an electrically erasable programmable read-only memory (EEPROM), a flash memory or other memory technology, a compact disc read-only memory (CD-ROM), a digital versatile disc (DVD) or other optical disc storage, a magnetic cartridge, a magnetic tape, a magnetic disk storage or other magnetic storage devices, or any other medium used for storing the desired information and accessible by a computer.

The computer-readable storage medium in this embodiment may be configured to store one or more computer programs that are executable by a processor to implement at least one operation of the method for establishing a data transmission link according to the first or second embodiment.

According to the method for establishing a data transmission link provided in an embodiment of the present disclosure, by means of establishing a PDU session, a PDU session ID and a QFI in the PDU session are encapsulated in a GRE tunnel ID by means of GRE, and a connection between the 5G-RG and the W-AGF is established through the GRE tunnel, such that the GRE tunnel connection established between the 5G-RG and the W-AGF is in one-to-one correspondence with the QoS flow of the PDU session, and user plane point-to-point connection between the 5G-RG and the W-AGF is realized in certain implementation processes.

Therefore, those of ordinary skill in the art will appreciate that all or some operations of the above-described method, functional modules/units in the system and apparatus may be implemented as software (which may be implemented by computer program codes executable by a computing device), firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit.

Moreover, it is well known to those of ordinary skill in the art that a communication medium typically includes a computer-readable instruction, a data structure, a computer program module, or other data in a modulated data signal, such as a carrier wave or other transport mechanism, and may include any information delivery medium. In this way, the present disclosure is not limited to any particular hardware and software combination.

The above is further detailed explanation of the embodiments of the present disclosure in conjunction with specific embodiments, and the present disclosure is not to be construed as being limited to these embodiments. For those ordinary skilled in the art to which the present disclosure pertains, several simple deductions or substitutions can be made without departing from the concept of the disclosure, which deductions and substitutions should also be considered as falling within the scope of the disclosure.

What is claimed is:

1. A method for establishing a data transmission link, comprising:
   forwarding, by a wireline access gateway function (W-AGF), a protocol data unit (PDU) session establishment request message sent from a 5G residential gateway (5G-RG) to an access and mobility management function (AMF); wherein the PDU session establishment request message is sent from the AMF to a session management function (SMF);
   receiving, by the W-AGF, a first N2 session request sent from the AMF, wherein the first N2 session request contains a PDU session establishment accept message generated by the SMF according to the PDU session establishment request message sent from the 5G-RG;
   generating, by the W-AGF, a first wireline access control plane protocol (W-CP) request message, and sending the first W-CP request message to the 5G-RG, wherein the first W-CP request message contains a PDU session ID and a quality of service (QoS) flow ID (QFI); and the PDU session ID and the QFI are sent from the AMF to the W-AGF;
   receiving, by the W-AGF, a first W-CP response message sent from the 5G-RG;
   sending, from the W-AGF, a PDU session establishment accept message to the 5G-RG;
   sending, from the W-AGF, a PDU session request acknowledgement message to the AMF to acknowledge establishment of a PDU session; and
   establishing a connection between the W-AGF and the 5G-RG through a generic routing encapsulation (GRE) tunnel, wherein an ID of the GRE tunnel contains the PDU session ID and the QFI; and the ID of the GRE tunnel is contained in a GRE key of a GRE header,
   wherein the method further comprises:
   receiving, by the W-AGF, a second N2 session request sent from the AMF, wherein the second N2 session request is generated by the AMF according to a PDU session management context update response sent from the SMF, the PDU session management context update response is generated by the SMF according to a PDU session management context update request sent from the AMF; and the second N2 session request contains a PDU session modification instruction message sent to the 5G-RG:
   generating, by the W-AGF, a second W-CP request message, and sending the second W-CP request message to the 5G-RG, wherein the second W-CP request message is generated according to the second N2 session request sent from the AMF, and the second W-CP request message contains a PDU session ID and an updated QFI;
   receiving, by the W-AGF, a second W-CP response message sent from the 5G-RG;
   sending, from the W-AGF, a PDU session request response message to the AMF;
   sending, from the W-AGF, a PDU session modification instruction message to the 5G-RG; and
   receiving, by the W-AGF, the PDU session modification acknowledgement message sent from the 5G-RG and sending the PDU session modification acknowledgement message to the AMF.

2. The method for establishing a data transmission link according to claim 1, wherein the W-CP is a wireless local area network (LAN) control plane protocol (WLCP).

3. A non-transitory computer readable storage medium having one or more computer programs stored thereon, wherein the one or more computer programs are executable by one or more processors to implement operations of the method for establishing a data transmission link according to claim 1.

4. An electronic device, comprising a processor and a memory having instructions stored thereon which, when executed by the processor, cause the processor to perform the method of claim 1.

5. A method for establishing a data transmission link, comprising:
   sending, from a 5G residential gateway (5G-RG), a protocol data unit (PDU) session establishment request message to an access and mobility management function (AMF); wherein the AMF sends the PDU session establishment request message to a session management function (SMF);
   receiving, by a wireline access gateway function (W-AGF), a first N2 session request sent from the AMF, wherein the first N2 session request contains a PDU session establishment accept message generated by the SMF according to the PDU session establishment request message sent from the 5G-RG;
   generating, by the W-AGF, a first wireline access control plane protocol (W-CP) request message, and sending the first W-CP request message to the 5G-RG, wherein the first W-CP request message contains a PDU session ID and a quality of service (QoS) flow ID (QFI); and the PDU session ID and the QFI are sent from the AMF to the W-AGF;
   receiving, by the 5G-RG, the first W-CP request message sent from the W-AGF, and sending a first W-CP response message to the W-AGF;

sending, from the W-AGF, a PDU session establishment accept message to the 5G-RG;

sending, from the W-AGF, a PDU session request acknowledgement message to the AMF to acknowledge establishment of a PDU session; and establishing a connection between the 5G-RG and the W-AGF through a generic routing encapsulation (GRE) tunnel, wherein an ID of the GRE tunnel contains the PDU session ID and the QFI; and the ID of the GRE tunnel is contained in a GRE key of a GRE header, wherein the method further comprises:

sending, from the 5G-RG, a PDU session modification request to the AMF which initiates a PDU session management context update request to the SMF;

updating and modifying, by the SMF, corresponding PDU session resources according to the PDU session management context update request and sending a session management context update response to the AME;

sending, from the AMF, a second N2 session request to the W-AGF, wherein the second N2 session request is generated by the AMF according to the PDU session management context update response sent from the SMF; and the second N2 session request contains a PDU session modification instruction message sent to the 5G-RG;

generating, by the W-AGF, a second W-CP request message, and sending the second W-CP request message to the 5G-RG, wherein the second W-CP request message is generated according to the N2 session request sent from the AMF, and the second W-CP request message contains a PDU session ID and an updated QFI; and receiving, by the 5G-RG, a second W-CP request message sent from the W-AGF and sending a second W-CP response message to the W-AGF;

sending, from the W-AGF, a PDU session request response message to the AMF;

sending, from the W-AGF, a PDU session modification instruction message to the 5G-RG; and returning, from the 5G-RG, a PDU session modification acknowledgement message to the W-AGF which sends the PDU session modification acknowledgement message to the AMF.

6. The method for establishing a data transmission link according to claim 5, wherein the W-CP is a wireless LAN control plane protocol (WLCP).

7. A non-transitory computer readable storage medium having one or more computer programs stored thereon, wherein the one or more computer programs are executable by one or more processors to implement operations of the method for establishing a data transmission link according to claim 5.

8. An electronic device, comprising a processor and a memory having instructions stored thereon which, when executed by the processor, cause the processor to perform the method of claim 5.

* * * * *